(12) United States Patent
Ko et al.

(10) Patent No.: US 9,017,785 B2
(45) Date of Patent: Apr. 28, 2015

(54) FLOOR PANEL HAVING ADHESIVE APPLIED SHEET

(75) Inventors: Hae Seung Ko, Chungcheongbuk-do (KR); Nam Yong Cho, Gyeonggi-do (KR)

(73) Assignee: LG Hausys, Ltd., Seoul (KR)

( * ) Notice: Subject to any disclaimer, the term of this patent is extended or adjusted under 35 U.S.C. 154(b) by 162 days.

(21) Appl. No.: 13/816,853

(22) PCT Filed: Aug. 22, 2011

(86) PCT No.: PCT/KR2011/006181
§ 371 (c)(1),
(2), (4) Date: Feb. 13, 2013

(87) PCT Pub. No.: WO2012/026722
PCT Pub. Date: Mar. 1, 2012

(65) Prior Publication Data
US 2013/0142980 A1    Jun. 6, 2013

(30) Foreign Application Priority Data
Aug. 23, 2010    (KR) .................. 10-2010-0081283

(51) Int. Cl.
*B32B 33/00*    (2006.01)
*B32B 9/00*    (2006.01)
(Continued)

(52) U.S. Cl.
CPC .......... *E04F 15/02155* (2013.01); *Y10T 428/14* (2015.01); *Y10T 428/1486* (2015.01); *B32B 3/06* (2013.01); *B32B 7/12* (2013.01); *B32B 27/08* (2013.01); *B32B 27/12* (2013.01); *B32B 27/304* (2013.01); *B32B 27/36* (2013.01); *B32B 37/182* (2013.01); *B32B 2250/05* (2013.01); *B32B 2250/44* (2013.01); *B32B 2255/10* (2013.01);
(Continued)

(58) Field of Classification Search
CPC .......... B32B 37/182; B32B 7/12; B32B 7/04; B32B 7/06; B32B 7/14; B32B 3/06; B32B 3/02; B32B 27/08; B32B 27/12; B32B 27/304; E04F 15/02155; E04F 15/02; E04F 15/10; E04F 15/0215
USPC .................. 428/40.1, 42.1, 42.2, 43
See application file for complete search history.

(56) References Cited

U.S. PATENT DOCUMENTS 5,750,227 A    5/1998    Adams
7,458,191 B2    12/2008    Stone
(Continued)

FOREIGN PATENT DOCUMENTS

CN    101177970 A    5/2008
EP    2060389    5/2009
(Continued)

*Primary Examiner* — Patricia L Nordmeyer
(74) *Attorney, Agent, or Firm* — McKenna Long & Aldridge, LLP

(57) ABSTRACT

The disclosed is a floor panel characterized in that a sheet is laminated to a tile, and the sheet has an L-shaped adhesive applied surface which is exposed at an edge portion of the tile, the tile comprises a glass fiber layer for size reinforcement and a middle layer formed of a PVC material which is attached to an upper portion of the glass fiber layer impregnated with PVC (Polyvinyl chloride) sol so as to maintain a balance between upper and lower portions, the sheet comprises a PVC sheet and an acrylic adhesive which is applied to one side of the PVC sheet, and the L-shaped adhesive applied surface of the sheet is covered by a protect film.

8 Claims, 3 Drawing Sheets

(51) Int. Cl.
*E04F 15/02* (2006.01)
*B32B 3/06* (2006.01)
*B32B 7/12* (2006.01)
*B32B 27/08* (2006.01)
*B32B 27/12* (2006.01)
*B32B 27/30* (2006.01)
*B32B 27/36* (2006.01)
*B32B 37/18* (2006.01)

(52) U.S. Cl.
CPC ..... *B32B 2262/101* (2013.01); *B32B 2264/104* (2013.01); *B32B 2307/412* (2013.01); *B32B 2307/71* (2013.01); *B32B 2307/75* (2013.01); *B32B 2419/04* (2013.01); *E04F 15/02* (2013.01); *E04F 2203/065* (2013.01)

(56) References Cited

U.S. PATENT DOCUMENTS

| | | | |
|---|---|---|---|
| 7,846,522 B2 * | 12/2010 | Kaminski et al. | 428/40.1 |
| 2007/0163194 A1 | 7/2007 | Stone | |
| 2010/0247834 A1 * | 9/2010 | Balmer et al. | 428/41.8 |

FOREIGN PATENT DOCUMENTS

| | | |
|---|---|---|
| JP | S49-030420 | 8/1974 |
| JP | 07-229280 | 8/1995 |
| JP | 2006-52524 A | 2/2006 |
| JP | 506874 A | 3/2008 |
| KR | 10-2003-0040694 | 5/2003 |
| KR | 10-2007-0072369 | 7/2007 |
| WO | 2007/052885 A1 | 5/2007 |
| WO | WO 2009/120311 | 10/2009 |

* cited by examiner

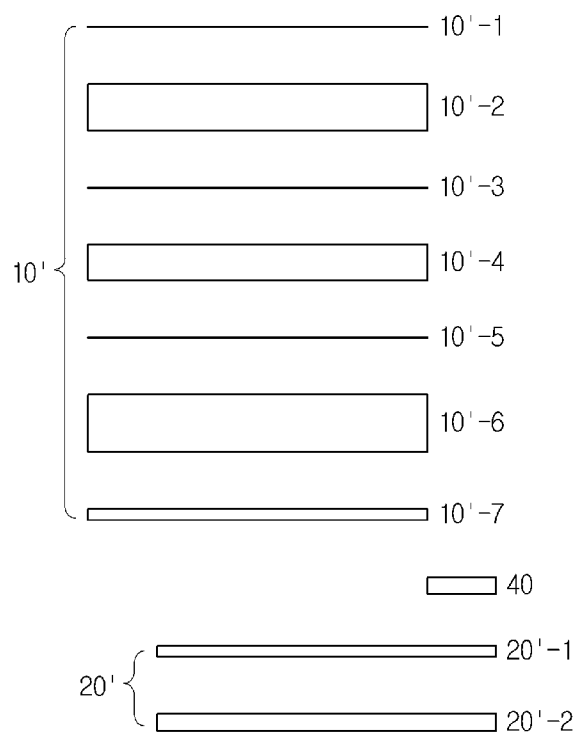

FLOOR PANEL HAVING ADHESIVE APPLIED SHEET

This application is a National Stage Entry of International Application No. PCT/KR2011/006181, filed Aug. 22, 2011, and claims the benefit of Korean Application No. 10-2010-0081283, filed on Aug. 23, 2010, which are hereby incorporated by reference in its entirety for all purposes as if fully set forth herein.

TECHNICAL FIELD

The present invention relates to a structural floor panel, and more particularly, to a floor panel in which an adhesive applied sheet is attached to a rear surface of the floor panel, thereby improving convenience of installing the floor panel having various patterns and removing a separate adhesive coating process when installing the floor panel, and also which is formed of an eco-friendly material, thereby improving operator and customer satisfaction.

BACKGROUND ART

Generally, after an adhesive is coated on a bottom surface, a resin floor panel used as a structural floor material is attached on the bottom surface.

Herein, most of the typical adhesives are mainly an oil-based type. Because the oil component is a harmful volatile material, the adhesive has a had influence on an operation upon installation and a user after the installation. As describe above, in case of the conventional resin floor panel, its material may exert a bad influence on the environment or human beings.

Further, when installing the conventional resin floor panel, a previous process of coating an adhesive on a floor surface is needed before installing the resin floor panel. Since the adhesive coating process has to depend on manual labor, constructability is remarkably lowered due to increase in working time and labor force.

DISCLOSURE OF INVENTION

Technical Problem

An object of the present invention is to provide a floor panel in which an adhesive applied sheet is attached to a rear surface of the floor panel, thereby improving convenience of installing the floor panel having various patterns and also removing a separate adhesive coating process when installing the floor panel, and which has high removal facility and recycling ability because the adhesive is not used, and also which is formed of an eco-friendly material, thereby improving operator and customer satisfaction.

Solution to Problem

To achieve the object of the present invention, the present invention provides a floor panel characterized in that a sheet is laminated to a tile, and the sheet has an L-shaped adhesive applied surface which is exposed at an edge portion of the tile, the tile comprises a glass fiber layer impregnated with PVC (Polyvinyl chloride) sol for size reinforcement and a middle layer formed of a PVC (Polyvinyl chloride) material which is attached to an upper portion of the glass fiber layer impregnated with PVC (Polyvinyl chloride) sol so as to maintain a balance between upper and lower portions, the sheet comprises a PVC (Polyvinyl chloride) sheet and an acrylic adhesive which is applied to one side of the PVC sheet, and the L-shaped adhesive applied surface of the sheet is covered by a protect film.

Preferably, the tile further comprises a print layer attached to an upper portion of the middle layer; a transparent cover layer attached to an upper portion of the print layer; a high strength UV layer stacked on the transparent cover layer; a base layer attached to a lower portion of the glass fiber layer; and an release layer attached to a lower portion of the base layer.

Preferably, the transparent cover layer has a thickness of 0.1~0.7 mm, the middle layer has a thickness of 0.1~0.7 mm, the glass fiber layer impregnated with PVC (Polyvinyl chloride) sol has a thickness of 0.1~0.5 mm, the base layer formed of a PVC (Polyvinyl chloride) material has a thickness of 1.0~2.0 mm, and the release layer formed of a PVC (Polyvinyl chloride) material has a thickness of 0.1~0.3 mm.

Preferably, the PVC sheet of the sheet has a thickness of 0.1~0.3 mm, and the acrylic adhesive of the sheet has a thickness of 10-100 μm.

Further, the present invention provides a floor panel characterized in that a sheet is laminated to a tile, and the sheet has an L-shaped adhesive applied surface which is exposed at an edge portion of the tile, the tile comprises a glass fiber layer impregnated with PLA (Polylactic acid) sol for size reinforcement and a middle layer formed of a PLA (Polylactic acid) material which is attached to an upper portion of the glass fiber layer impregnated with PLA (Polylactic acid) sol so as to maintain a balance between upper and lower portions, the sheet comprises a PLA (Polylactic acid) sheet and an acrylic adhesive which is applied to one side of the PLA sheet, and the L-shaped adhesive applied surface of the sheet is covered by a protect film.

Advantageous Effects of Invention

According to the floor panel of the present, since the adhesive applied sheet is additionally attached to the rear surface of the floor panel, it is possible to remove the difficult adhesive coating process and thus to facilely install the floor panel. Further, the floor panel can be facilely demolished if necessary, the convenience of installing the floor panel is improved.

In addition, since the protect film may be provided at the adhesive portion of the sheet, it is prevented that the adhesive is damaged due to a contamination source such as dust and moisture.

BRIEF DESCRIPTION OF DRAWINGS

The above and other objects, features and advantages of the present invention will become apparent from the following description of preferred embodiments given in conjunction with the accompany drawings, in which:

FIG. 6 is a cross-sectional view showing a configuration of the floor panel according to another embodiment of the present invention.

BEST MODE FOR CARRYING OUT THE INVENTION

Hereinafter, the embodiments of the present invention will be described in detail. For convenience of explanation, an apparatus and a method of attaching a protect film and a sheet to a tile of a floor panel according to the present invention will be described firstly, and a composition of the floor panel according to the present invention will be described later.

Figure 1:
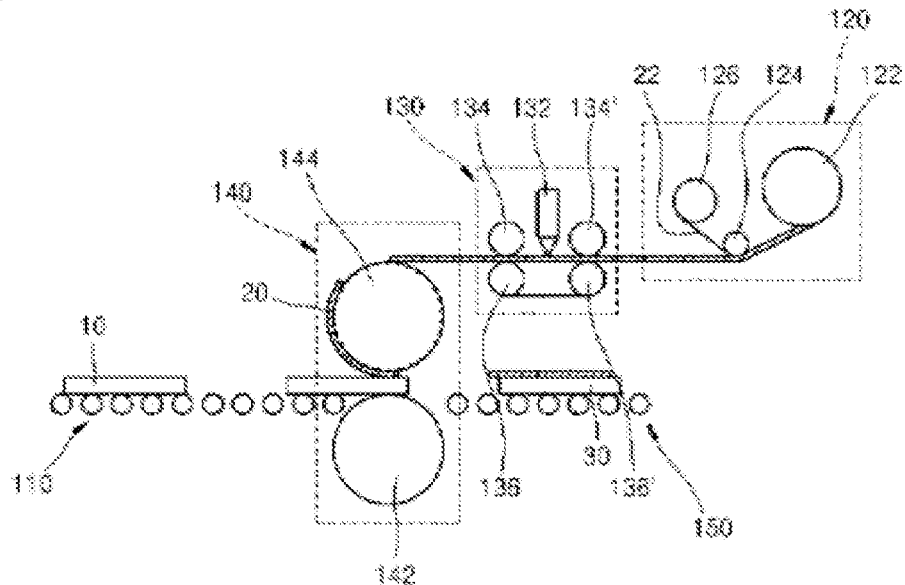
FIG. 1 is a view showing a partial configuration of an apparatus for manufacturing a floor panel according to an embodiment of the present invention.

As shown in FIG. 1, an apparatus for manufacturing a floor panel according to the present invention includes a first transferring portion 110 for transferring a tile 10, a release paper collecting portion 120 which receives a sheet and removes a release paper, a sheet cutting portion 130 for cutting the sheet, a laminating portion 140 for laminating the sheet to the tile 10, and a second transferring portion 150 for transferring a floor panel (hereinafter, called as "first stage floor panel") in which the sheet is laminated to the tile 10.

The first transferring portion 110 functions to supply a resin tile 10, to which an adhesive applied sheet 20 is not yet laminated, to the apparatus for manufacturing the floor panel according to the present invention.

The release paper collecting portion 120 is to remove a release paper 22 of the sheet 20 which is stacked to a rear surface of the tile 10 so as to perform an adhesive function. To this end, the adhesive is previously coated on the sheet 20, and the release paper 22 is attached to an adhesive portion of the sheet 20. The release paper collecting portion 120 includes a sheet supplying roll 122 for supplying the sheet, and a release paper collecting roll 126 for separating only the release paper 22 attached to the sheet. The release paper collecting portion 120 may further include a tension roll 124 which is disposed between the sheet supplying roll 122 and the release paper collecting roll 126 so as to provide desired tension force to the sheet, thereby helping in separating the release paper 22.

The sheet cutting portion 130 functions to cut (132) the sheet into a desired length, in which the release paper is separated in the release paper collecting portion 120 and an adhesive applied surface is exposed. The sheet cutting portion 130 is comprised of an upper roll 134, 134' and a lower roll 136, 136'.

The laminating portion 140 may be a pressure type roll set 142, 144 which is disposed at a distal end of the first transferring portion 110. In case of the pressure type roll set 142, 144, a desired gap is formed between rolls. The first stage floor panel 30 in which the sheet 20 and tile 10 are integrally attached in the laminating portion 140 is transferred through the second transferring portion 150.

The first stage floor panel 30 transferred through the second transferring portion 150 is transferred to a protect film attaching unit shown in FIG. 3 which is described below.

Figure 2:
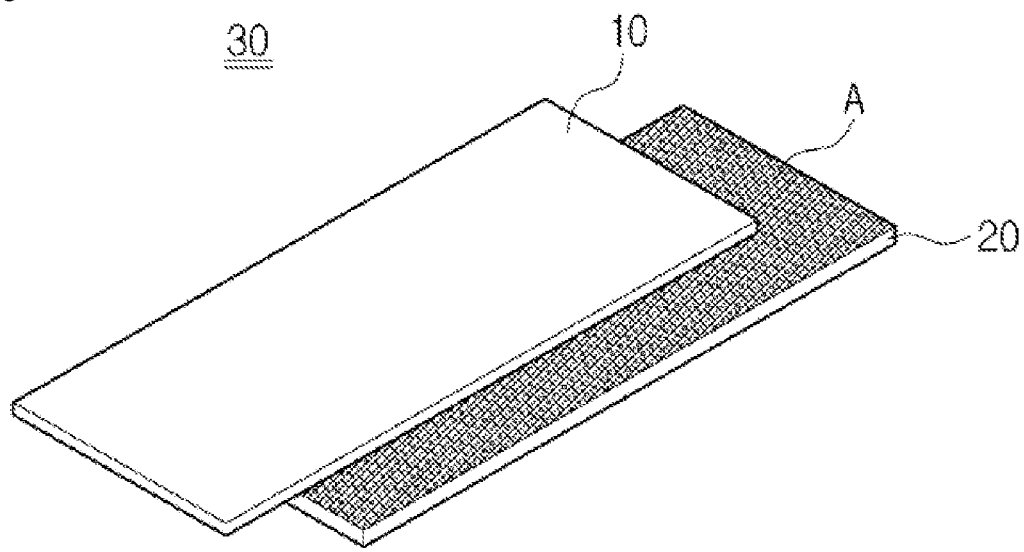
FIG. 2 is a view showing a state that a sheet is laminated to a tile.

In the first stage floor panel 30 shown in FIG. 2, the sheet 20 stacked on the rear surface of the tile 10 is partially exposed to an outside of the tile 10. Hereinafter, a bonding state that the floor panel and the sheet are partially exposed so as to respectively have an L-shaped exposed portion is called as 'offset bond'. A portion of the sheet 20 which is offset and exposed is the adhesive applied surface A on which the adhesive is coated. Due to the exposed adhesive applied surface A, multiple floor panels can be installed in parallel.

However, in the first stage floor panel 30, if the adhesive applied surface of the sheet is exposed to the air, it may be contaminated by moisture or dust. Further, in case that the adhesive applied surface of the sheet is stained with dusts, adhesive force may be insufficient when installing the floor panel. Therefore, it is necessary to protect the adhesive applied surface A using a protect film. Hereinafter, the protect film attaching unit for attaching the protect film to the adhesive applied surface will be described.

Figure 3:
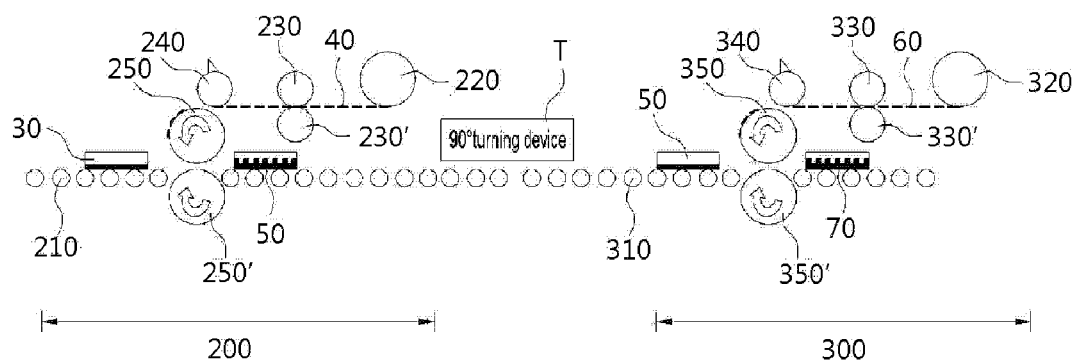
FIG. 3 is a view showing a protect film attaching unit of the apparatus for manufacturing the floor panel according to the embodiment of the present invention.

FIG. 3 is a view showing a protect film attaching unit of the apparatus for manufacturing the floor panel according to the embodiment of the present invention.

The adhesive applied surface A formed into an L-shape is formed by two edge portions of the first stage floor panel 30. The protect film attaching unit of the present invention firstly attaches the protect film to the L-shaped adhesive applied surface in one of length and transverse directions of the floor panel, and then later attaches the protect film in the other direction. Preferably, the protect film attaching unit of the present invention firstly attaches the protect film to the L-shaped adhesive applied surface in the length direction and then in the width direction.

Hereinafter, the unit for attaching the protect film in the length direction of the floor panel is called 'a first protect film attaching unit 200', and the unit for attaching the protect film in the width direction of the floor panel is called 'a second protect film attaching unit 300'. The film which is attached in the length direction is called 'a first protect film' and the film which is attached in the width direction is called 'a second protect film'.

The first protect film attaching unit will be described.

The first protect film attaching unit 200 includes a third transferring portion 210 for transferring the first stage floor panel 30, a first protect film roll 220 on which the first protect film 40 is wound, a first protect film supplying roll 230, 230' for supplying the first protect film 40 in a desired length, a first knife 240 for cutting the supplied first protect film in a desired length, and a first protect film laminating roll 250, 250' for laminating the first protect film to the first stage floor panel.

The first protect film 40 which is wound on the first protect film roll 220 is supplied to the first protect film attaching unit by rotation of the first protect film supplying roll 230, 230'. The first knife is disposed at a front side of the first protect film supplying roll so as to cut the protect film in a desired length. The first protect film laminating roll 250, 250' is a pressure type roll set having upper and lower rolls disposed at a distal end of the third transferring portion 210.

Figure 4:
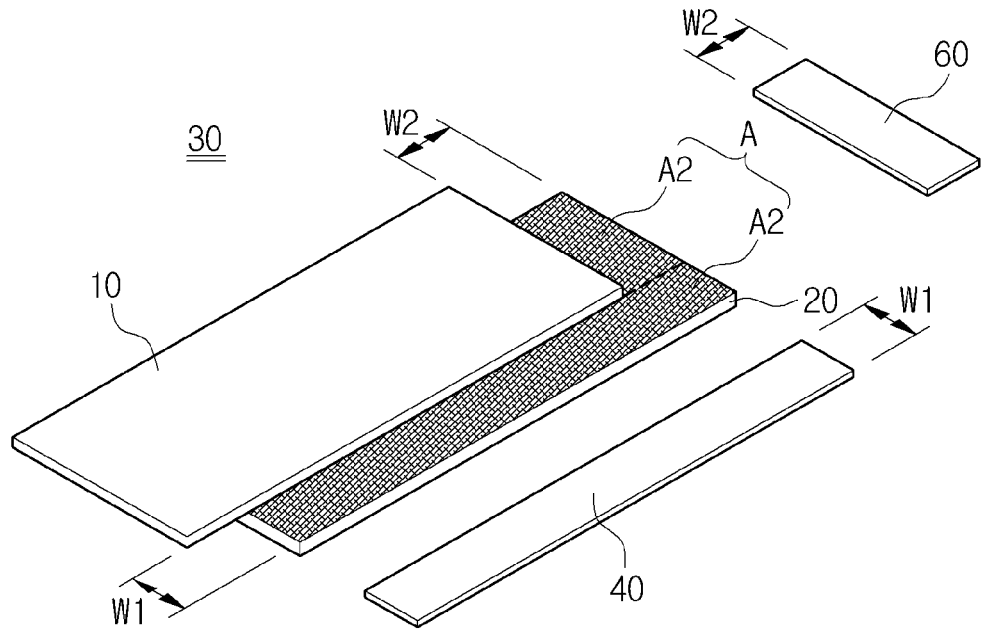
FIG. 4 is a schematic view showing a state that a protect film is attached to an adhesive applied surface of the floor panel.

By the first protect film laminating roll 250, 250', the first protect film 40 is attached to a length-directional adhesive applied surface A1 of the adhesive applied surface A of the first stage floor panel 30 (referring to FIG. 4). A width of the first protect film 40 is corresponding to a width (w1 of FIG. 4) of the length-directional adhesive applied surface A1 of the adhesive applied surface A of the first stage floor panel 30.

The first stage floor panel 30 is integrally laminated with the first protect film 40 by the first protect film laminating roll 250,250'. For convenience of explanation, the first stage floor panel 30 laminated with the first protect film 40 is called 'a second stage floor panel 50'. The second stage floor panel 50 is transferred to the second protect film attaching unit by a transferring portion having a plurality of rolls to be described below.

Before introduced into the second protect film attaching unit, the second stage floor panel 50 is rotated at an angle of 90° around an axis vertical to a surface of the floor panel by a 90° turning unit T. This turning process facilitates attaching of the protect film in the transverse direction of the floor panel.

The second protect film attaching unit 300 includes a fourth transferring portion 310 for transferring the second stage floor panel 50, a second protect film roll 320 on which the second protect film 60 is wound, a second protect film supplying roll 330, 330' for supplying the second protect film 60 in a desired length, a second knife 340 for cutting the supplied second protect film in a desired length, and a second protect film laminating roll 350, 350' for laminating the second protect film to the second stage floor panel.

The fourth transferring portion 310 is a conveyor which is comprised of a combination of multiple rollers so as to easily and stably transfer a loaded article. The second protect film 60 which is wound on the second protect film roll 320 is supplied to the second protect film attaching unit by rotation of the second protect film supplying roll 330, 330'. The second knife is disposed at a front side of the second protect film supplying roll so as to cut the protect film in a desired length.

The second protect film laminating roll 350, 350' is a pressure type roll set having upper and lower rolls disposed at a distal end of the fourth transferring portion 310. By the second protect film laminating roll 350, 350', the second protect film 60 is attached to a transverse-directional adhesive applied surface A2 of the adhesive applied surface A of the second stage floor panel 50 (referring to FIG. 4). A width of the second protect film 60 is corresponding to a width (w2 of FIG. 4) of the transverse-directional adhesive applied surface A2 of the adhesive applied surface A of the second stage floor panel 50. The second stage floor panel 50 is integrally laminated with the second protect film 60 by the second protect film laminating roll 350, 350', thereby manufacturing a finished floor panel 70.

Hereinafter, materials for the floor panel will be described. In the floor panel of the present invention, the sheet 20 is attached to the tile 10, and the adhesive applied portion of the sheet is covered by the protect film.

Figure 5:
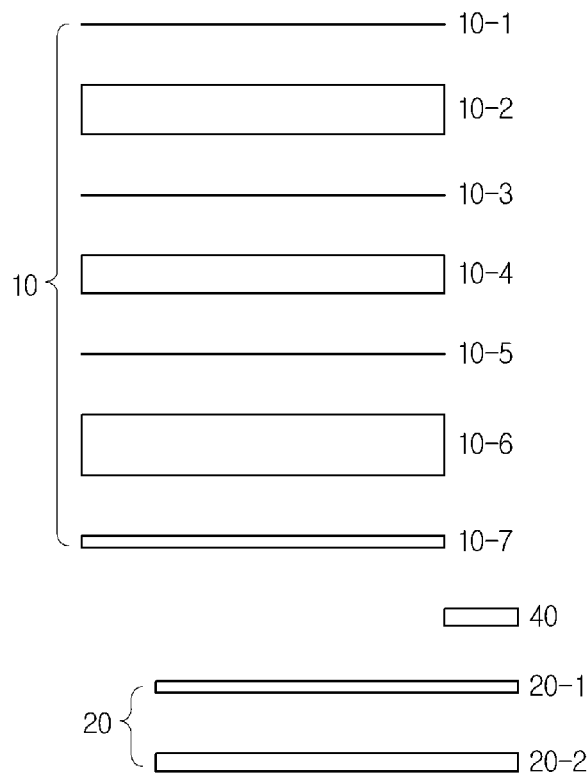
FIG. 5 is a cross-sectional view showing a configuration of the floor panel according to an embodiment of the present invention.

FIG. 5 shows a cross-sectional view of the floor panel according to an embodiment of the present invention. In the tile of the floor panel, a base layer is formed at a lower portion thereof, and a plurality of layers such as a middle layer and a print layer are formed an upper portion thereof, and an UV layer is stacked thereon. More specifically, the tile 10 includes a high strength UV layer 10-1, a transparent cover layer 10-2, a print layer 10-3, a middle layer 10-4, a glass fiber layer impregnated with PVC (Polyvinyl chloride) sol 10-5, a base layer 10-6 and an release layer 10-7. And in the sheet 20, an acrylic adhesive 20-1 is applied to one side of a PVC (Polyvinyl chloride) sheet 20-2, and the protect film 40 is attached to the adhesive applied portion so as to prevent the applied adhesive from being damaged.

In the dimensions of the tile, it is preferable that the transparent cover layer 10-2 formed of a PVC (Polyvinyl chloride) material has a thickness of 0.1~0.7 mm, and the middle layer 10-4 for maintaining a balance between the upper and lower portions of the tile is formed of a PVC material and has a thickness of 0.1~0.7 mm, and the reinforcing glass fiber layer impregnated with PVC (Polyvinyl chloride) sol 10-5 has a thickness of 0.1~0.5 mm. The present invention is characterized by providing the glass fiber layer impregnated with PVC (Polyvinyl chloride) sol for size stability of the resin tile. Preferably, the base layer 10-6 formed of a PVC (Polyvinyl chloride) material has a thickness of 1.0~2.0 mm, and the release layer formed of a PVC (Polyvinyl chloride) material has a thickness of 0.1~0.3 mm.

In the configuration of the sheet 20, a lower portion thereof formed of a PVC (Polyvinyl chloride) sheet has a thickness of 0.1~0.3 mm, and the acrylic adhesive applied to an upper portion thereof has a thickness of about 10~100 μm. The protect film 40 is attached to a portion of the sheet that the acrylic adhesive is exposed to the outside.

The protect film may be formed of one of paper, PP (Polypropylene), PE (Polyethylene) and PET (Polyethylene terephthalate).

In a manufacturing process of the floor panel of the present invention, raw materials including PVC (Polyvinyl chloride), DOTP (Dioctyl terephthalate) plasticizer, calcium carbonate filler and stabilizer are mixed using a mixing device, and kneaded for 180 seconds using a kneader having a steam pressure of $6\pm2.0$ kgf/cm$^2$, and then forms the base layer having a thickness of 1.55 mm using a roll mixing device. The release layer having a thickness of 0.15 mm is attached to a lower portion of the base layer using a laminating roll, and the reinforcing glass fiber layer impregnated with PVC (Polyvinyl chloride) sol and having a thickness of 0.3 mm is continuously laminated to an upper portion of the base layer using the laminating roll. For structural balance, the PVC middle layer having a thickness of 0.5 mm is laminated using the laminating roll, and a print layer for providing an appearance design is laminated, and the transparent cover layer having a thickness of 0.5 mm is also laminated using the laminating roll, and then a surface thereof is UV-treated.

According to the present invention, DOPT as eco-friendly plasticizer of PVC is used in order to improve the user satisfaction.

FIG. 5 shows the floor panel formed of the PVC material, but the invention is not limited to this. FIG. 6 shows the floor panel formed of a PLA (Polylactic acid) material according to another embodiment of the present invention.

That is, in the dimensions of the tile 10' shown in FIG. 6, it is preferable that the transparent cover layer 10'-2 formed of a PLA (Polylactic acid) material has a thickness of 0.~0.7 mm, and the middle layer 10'-4 for maintaining a balance between the upper and lower portions of the tile is formed of a PLA (Polylactic acid) material and has a thickness of 0.1~0.7 mm, and the reinforcing glass fiber layer impregnated with PLA (Polylactic acid) sol 10'-5 has a thickness of 0.1~0.5 mm. The present invention is characterized by providing the glass fiber layer impregnated with PLA (Polylactic acid) sol for size stability of the resin tile. Preferably, the base layer 10'-6 formed of a PLA (Polylactic acid) material has a thickness of 1.0~2.0 mm, and the release layer formed of a PLA (Polylactic acid) material has a thickness of 0.1~0.3 mm.

In the configuration of the sheet 20' of FIG. 6, a lower portion thereof formed of a PLA (Polylactic acid) sheet 20'-2 has a thickness of 0.1~0.3 mm, and the acrylic adhesive 20'-1 applied to an upper portion thereof has a thickness of about 10~100 μm. The protect film 40 is attached to a portion of the sheet that the acrylic adhesive is exposed to the outside.

In the above-mentioned embodiments, the tile or sheet is formed of a PVC (Polyvinyl chloride) or PLA (Polylactic acid) material. However, it is possible that the tile or sheet is formed of PET (Polyethylene terephthalate), PE (Polyethylene), PP (Polypropylene) and rubber.

While the present invention has been described with respect to the specific embodiments, it will be apparent to those skilled in the art that various changes and modifications may be made without departing from the spirit and scope of the invention as defined in the following claims.

INDUSTRIAL APPLICABILITY

According to the floor panel of the present, since the adhesive applied sheet is additionally attached to the rear surface of the floor panel, it is possible to remove the difficult adhesive coating process and thus to facilely install the floor panel. Further, the floor panel can be facilely demolished if necessary, the convenience of installing the floor panel is improved.

In addition, since the protect film may be provided at the adhesive portion of the sheet, it is prevented that the adhesive is damaged due to a contamination source such as dust and moisture.

The invention claimed is:

1. A floor panel characterized in that:

a sheet is laminated to a tile, and the sheet has an L-shaped adhesive applied surface which is exposed at an edge portion of the tile, the tile comprises a glass fiber layer impregnated with PVC (Polyvinyl chloride) sol for size reinforcement and a middle layer formed of a PVC material which is attached to an upper portion of the glass fiber layer so as to maintain a balance between upper and lower portions, the sheet comprises a PVC sheet and an acrylic adhesive which is applied to one side of the PVC sheet, and the L-shaped adhesive applied surface of the sheet is covered by a protect film, wherein the tile further comprises a print layer attached to an upper portion of the middle layer; a transparent cover layer attached to an upper portion of the print layer; a high strength UV layer stacked on the transparent cover layer; a base layer attached to a lower portion of the glass fiber layer; and a release layer attached to a lower portion of the base layer.

2. The floor panel according to claim 1, wherein the protect film is formed of one of paper, PP (Polypropylene), PE (Polyethylene) and PET (Polyethylene terephthalate).

3. The floor panel according to claim 1, wherein the transparent cover layer has a thickness of 0.1~0.7 mm, the middle layer has a thickness of 0.1~0.7 mm, the glass fiber layer has a thickness of 0.1~0.5 mm, the base layer formed of a PVC material has a thickness of 1.0~2.0 mm, and the release layer formed of a PVC material has a thickness of 0.1~0.3 mm.

4. The floor panel according to claim 3, wherein the PVC sheet of the sheet has a thickness of 0.1~0.3 mm, and the acrylic adhesive of the sheet has a thickness of 10-100 μm.

5. A floor panel characterized in that:

a sheet is laminated to a tile, and the sheet has an L-shaped adhesive applied surface which is exposed at an edge portion of the tile, the tile comprises a glass fiber layer impregnated with PLA (Polylactic acid) sol for size reinforcement and a middle layer formed of a PLA material which is attached to an upper portion of the glass fiber layer so as to maintain a balance between upper and lower portions, the sheet comprises a PLA sheet and an acrylic adhesive which is applied to one side of the PLA sheet, and the L-shaped adhesive applied surface of the sheet is covered by a protect film, wherein the tile further comprises a print layer attached to an upper portion of the middle layer; a transparent cover layer attached to an upper portion of the print layer; a high strength UV layer stacked on the transparent cover layer; a base layer attached to a lower portion of the glass fiber layer; and a release layer attached to a lower portion of the base layer.

6. The floor panel according to claim 5, wherein the protect film is formed of one of paper, PP (Polypropylene), PE (Polyethylene) and PET (Polyethylene terephthalate).

7. The floor panel according to claim 5, wherein the transparent cover layer formed of a PLA material has a thickness of 0.1~0.7 mm, the middle layer formed of a PLA material has a thickness of 0.1~0.7 mm, the glass fiber layer has a thickness of 0.1~0.5 mm, the base layer formed of a PLA material has a thickness of 1.0~2.0 mm, and the release layer formed of a PLA material has a thickness of 0.1~0.3 mm.

8. The floor panel according to claim 7, wherein the PLA sheet of the sheet has a thickness of 0.1~0.3 mm, and the acrylic adhesive of the sheet has a thickness of 10-100 μm.

* * * * *